United States Patent [19]

Rodriguez

[11] Patent Number: 4,896,693
[45] Date of Patent: Jan. 30, 1990

[54] UPPER PORTION OR CARTRIDGE OF A TAP

[75] Inventor: Jean-Jacques Rodriguez, Douvaine, France

[73] Assignee: Kugler, Fonderie Et Robinetterie S.A., Geneva, Switzerland

[21] Appl. No.: 236,372

[22] Filed: Aug. 25, 1988

[30] Foreign Application Priority Data

Sep. 11, 1987 [CH] Switzerland .................... 03525/87

[51] Int. Cl.$^4$ ........................................... F16K 11/08
[52] U.S. Cl. ............................... 137/454.5; 137/625.3; 137/625.31
[58] Field of Search ............... 137/454.2, 454.5, 454.6, 137/625.3, 625.31; 251/304

[56] References Cited

U.S. PATENT DOCUMENTS 4,651,770  3/1987  Denham et al. ............. 137/454.5 X

FOREIGN PATENT DOCUMENTS

| 3459 | 8/1979 | European Pat. Off. ....... 137/625.31 |
| 0065266 | 11/1982 | European Pat. Off. . |
| 0103710 | 3/1984 | European Pat. Off. . |
| 0129659 | 1/1985 | European Pat. Off. . |
| 3226644 | 2/1983 | Fed. Rep. of Germany . |
| 3207895 | 12/1983 | Fed. Rep. of Germany . |
| 2468805 | 5/1981 | France . |
| 2487940 | 2/1982 | France . |

Primary Examiner—Stephen M. Hepperle
Attorney, Agent, or Firm—Young & Thompson

[57] ABSTRACT

A tap cartridge comprises lateral indentations (27, 28) positioned angularly and axially with respect to the body of the cartridge (1) defining with bores (21 to 24) of different diameters of this cartridge (1) wall parts (31, 34) forming on the one hand angular positioning lugs (31) of a ceramic plate which is fixed on said cartridge and on the other hand abutments (34) limiting the angular stroke of a shaft controlling a rotating plate with respect to said cartridge.

2 Claims, 3 Drawing Sheets

UPPER PORTION OR CARTRIDGE OF A TAP

The present invention relates to the part or upper portion of a tap, usually called cartridge, and more particularly to a cartridge of a tap or valve the obturator of which is constituted by two ceramic plates one of which is fixed onto the cartridge whereas the other can be driven into rotation by means of a control shaft and a driver between two extreme positions, corresponding to the complete opening or the closure of the tap, which are positively defined by abutments.

There are numerous cartridges of this kind which are for example described in the documents DE-PS-32 07 895; DE-OS-32 26 644 or EP-A1-01 103 710 which all have the major drawback of a difficult and onerous manufacture which necessarily includes machining operations to be made on different machine tools or with the cartridge body fastened in different positions, such as broachings, drillings, and other machinings. As a matter of fact any machining operation necessitating a restart, that is with a modification of the fixing of the work piece on its support or its transfer onto another machine tool or machining unit leads to loss of time, a reduction of the machining precision and the use of complex machines or machining centers.

The present invention has for its object a tap cartridge and its manufacturing method enabling to realize all the functions required from such a part but which do not have the precited drawbacks and being able to be machined without any restarted operations.

The tap cartridge and its manufacturing method distinguish themselves by the characteristics described and claimed in the following:

The attached drawing shows schematically and by way of example one particular embodiment of the tap cartridge according to the invention.

Figure 1:
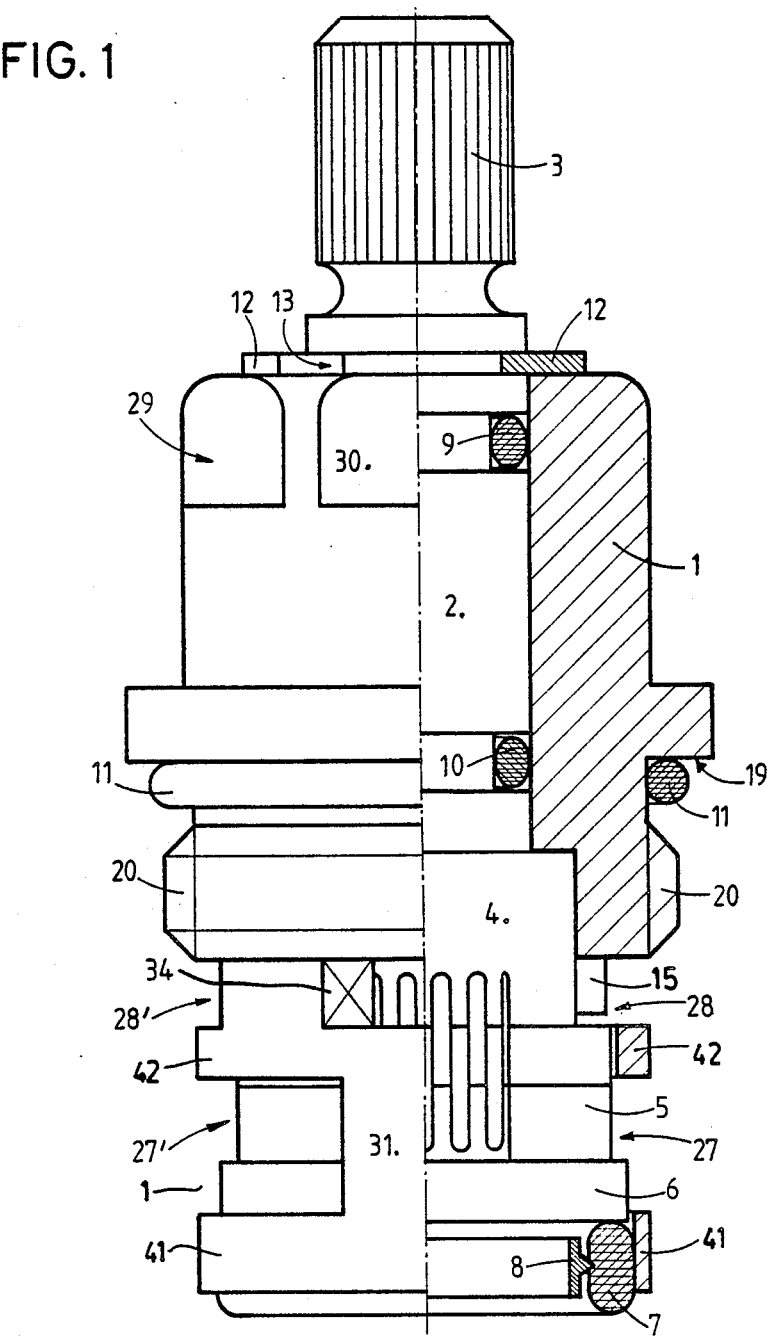
FIG. 1 is an assembled view of a tap partially in elevation and partially in crossection.

The tap shown at FIG. 1 comprises a cartridge 1 presenting original features as will be seen thereafter and constitutes the heart of the present invention, a control shaft 2 the upper end of which 3 merges out of the cartridges and is intended to cooperate with a non illustrated handle. This control shaft 2 is displaceable with respect to the cartridge 1 angularly between two abutments of said cartridge defining the whole opening and closure positions of the tap. This control shaft 2 drives, through a driver 4, the rotative ceramic plate 6 cooperating with the fixed ceramic plate 5. The lower end of the cartridge 1 is provided with a ring joint 7 and a ring 8 maintaining said joint 7 as well as lower annular ring 41 and second annular ring 42.

Ring joints 9, 10 are provided to make the tightness between the control shaft 2 and the cartridge 1 whereas a ring joint 11 makes the tightness between the cartridge 2 and the body, not shown, of the tap.

A resilient clip 12 located in a groove 13 of the control shaft fixes the service or assembled position of said shaft 2 with respect to the cartridge 1.

Figure 2:
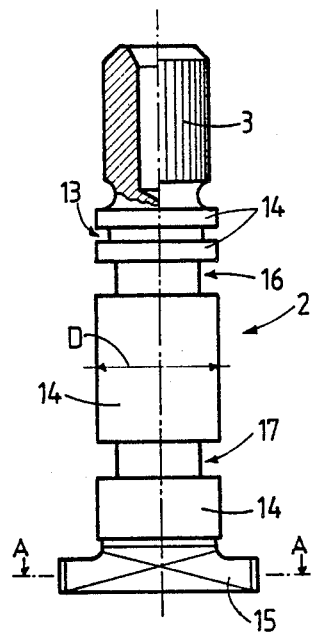
FIG. 2 is a side view of the driving shaft of the movable plate of the tap shown at FIG. 1.
Figure 3:
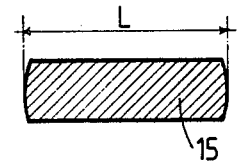
FIG. 3 is a crossection along line A—A of FIG. 2.

The control shaft 2 is shown in detail at FIGS. 2 and 3. It comprises a cylindrical body 14 the upper end of which 3 is constituted by a ripped portion of less diameter intended to cooperate with a handle and the lower end of which is provided with a driving bar 15 having a substantially rectangular crossection (FIG. 3) and the length L of which is greater than the diameter D of the body 14.

This body 14 has two grooves 16, 17 receiving the joints 9, 10 respectively, as well as the groove 13.

Figure 4:
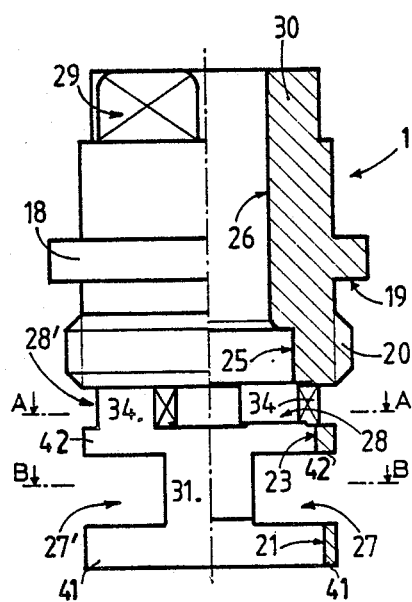
FIG. 4 is a side view, partially in crossection of the tap cartridge shown at FIG. 1.
Figure 5:
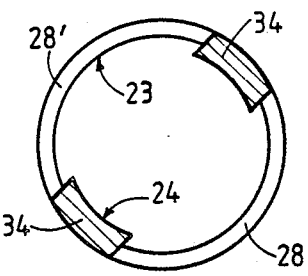
FIG. 5 is a crossection taken along line A—A of FIG. 4.
Figure 6:
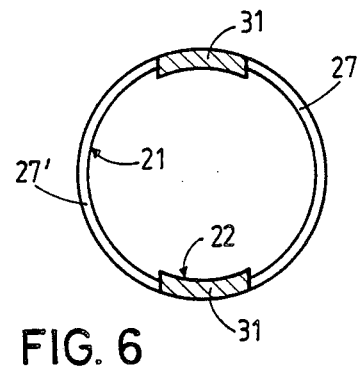
FIG. 6 is a view along line B—B of FIG. 4.
Figure 7:
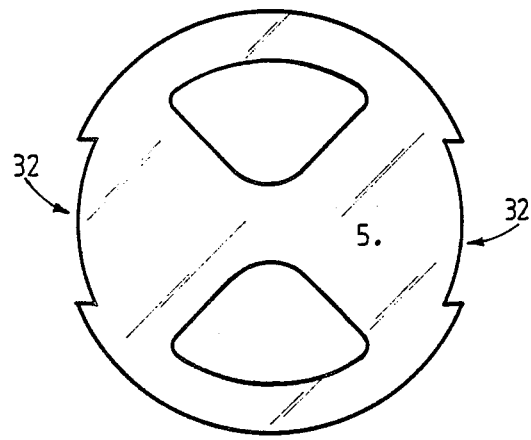
FIG. 7 is a plan view of the fixed plate of the tap shown at FIG. 1.
Figure 8:
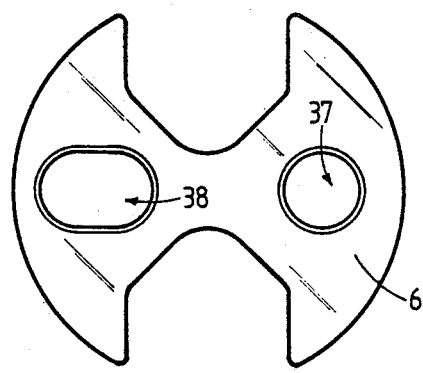
FIG. 8 is a plan view of the rotating plate of the tap shown at FIG. 1.
Figure 9:
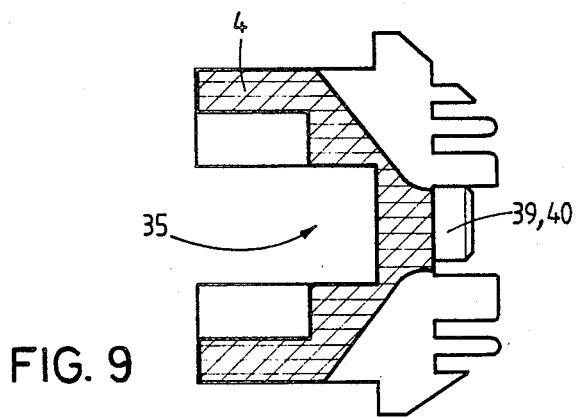
FIG. 9 is a crossection view of the driver making the linkage between the control shaft shown at FIG. 2 and the rotating plate shown at FIG. 8 of the tap shown at FIG. 1.

The cartridge 1 shown at FIGS. 4 to 6 has a body presenting a substantially cylindrical shape obtained by machining, without any restarted operation from a solid bar having a diameter corresponding substantially to that of part 18 forming a shoulder 19 for the joint 11.

The bar being fixed into the mandrel of a machine tool one makes the following machining operations to realize the cartridge 1:

By turning one forms the different outside diameters of the cartridge. Simultaneously the thread 20, used for fixing the cartridge on the body of a tap is machined. Also simultaneously all the inside diameters are rough-machined by means of only one tool, the diameters 21 to 26 of the axial bores of the cartridge getting smaller as from its lower end. The planing of the lower face of the cartridge is also made during the same time.

By milling, one forms simultaneously the lateral openings 27, 27' and 28, 28' as well as the faces 29 of the upper hexagonal shape 30 of the cartridge 1.

One terminates the machining of the cartridge by the finishing of all the inside diameters 21 to 26 with only one finishing tool enabling to take out the burrs due to the millings, particularly of the openings 27, 28.

The bar is cut and the cartridge is finished.

Thus, operations of only turning, boring, milling and cutting, being made without restart, are necessary for forming from a solid bar the cartridge 1.

The wall parts 31 having an inside surface 22 cooperate with peripheral slots 32 of the fixed ceramic plate 5 the angular position of which is thus fixed with respect to the cartridge 1. Diagrametrically opposed wall parts 31 also serve to connect rings 41 and 42.

The wall parts 34 having an inside surface 24 form the abutments cooperating with the driving bar 15 of the control shaft to limit its angular displacements with respect to the cartridge 1. This driving bar 15 is located in a slot 35 which is provided in the driver 4 and merges laterally out of it to cooperate with the abutment 34, its length L being greater than the distance between opposed wall parts 34. Diametrically opposed wall parts 34 also serve to connect ring 42 to an upper part of the cartridge body.

Due to the width of the abutments 34 and the one of the bar 15 it is possible to define the maximum angular stroke of the control shaft with respect to the cartridge 1 as well as the extreme relative positions of these elements and therefore of the fixed plate 5 and rotating plate 6. The plate 6 is provided with two dead housings 37, 38 in its upper surface in which driving fingers 39, 40 of the driver 4 extend ensuring thus the driving linkage for the rotation of said rotating plate 6 by the control shaft 2.

The ceramic plates 5 and 6, resting face against face with a pressure defined by the compression of spring 7, comprise, as the existing plates, openings defining according to their relative positions the water flow. The relative angular positions of these plates corresponding to the cut-off of the flow respectively to the maximum flow are defined by the abutments 34 cooperating with the bar 15.

I claim:

1. In a tap cartridge comprising two plates one of which is fixed on the cartridge and the other rotatable by means of a control shaft between an open position and a closed position corresponding to the opening or closing of the tap, the improvement wherein said tap cartridge comprises
    a control shaft including driving means at a lower end thereof positioned within said cartridge,
    a sleeve having internal bores of differing diameter, the diameter of said internal bores diminishing from a lower open end of said cartridge to an opposing upper end of said cartridge,
    abutment lugs for limiting the angular rotation of said control shaft within said cartridge by means of direct cooperative engagement with portions of said control shaft, and positioning lugs for retaining said fixed plate in position within said cartridge,
    two pairs of opposed water outlets in side portions thereof,
    lateral edges of said opposed water outlets in said side portions of said cartridge forming said positioning lugs and abutment lugs,
    two spaced apart annular rings, a lower one of said annular rings positioned adjacent said lower open end, said annular rings connected together by means of two diametrically opposed wall portions, the inside diameter of said lower annular ring being greater than the distance between said wall portions, and the distance between said wall portions being greater than the inside diameter of the second annular ring, and said diametrically opposed wall portions forming said positioning lugs for retaining said fixed plate in position within said cartridge.

2. The tap cartridge of claim 1, wherein said second annular ring is connected to said upper portion of said cartridge by means of two second diametrically opposed wall portions, the distance between said second wall portions being less than the internal diameter of said second annular ring but greater than the largest diameter of the bore terminating in the upper end of the body of the cartridge, said second wall portions forming said abutment lugs for limiting the angular rotation of said control shaft within said cartridge.

* * * * *